Aug. 21, 1956     W. M. ROSS     2,759,633
PREDETERMINED COUNTER CONTROL FOR CONTAINER FILLING SYSTEM
Filed Sept. 23, 1955
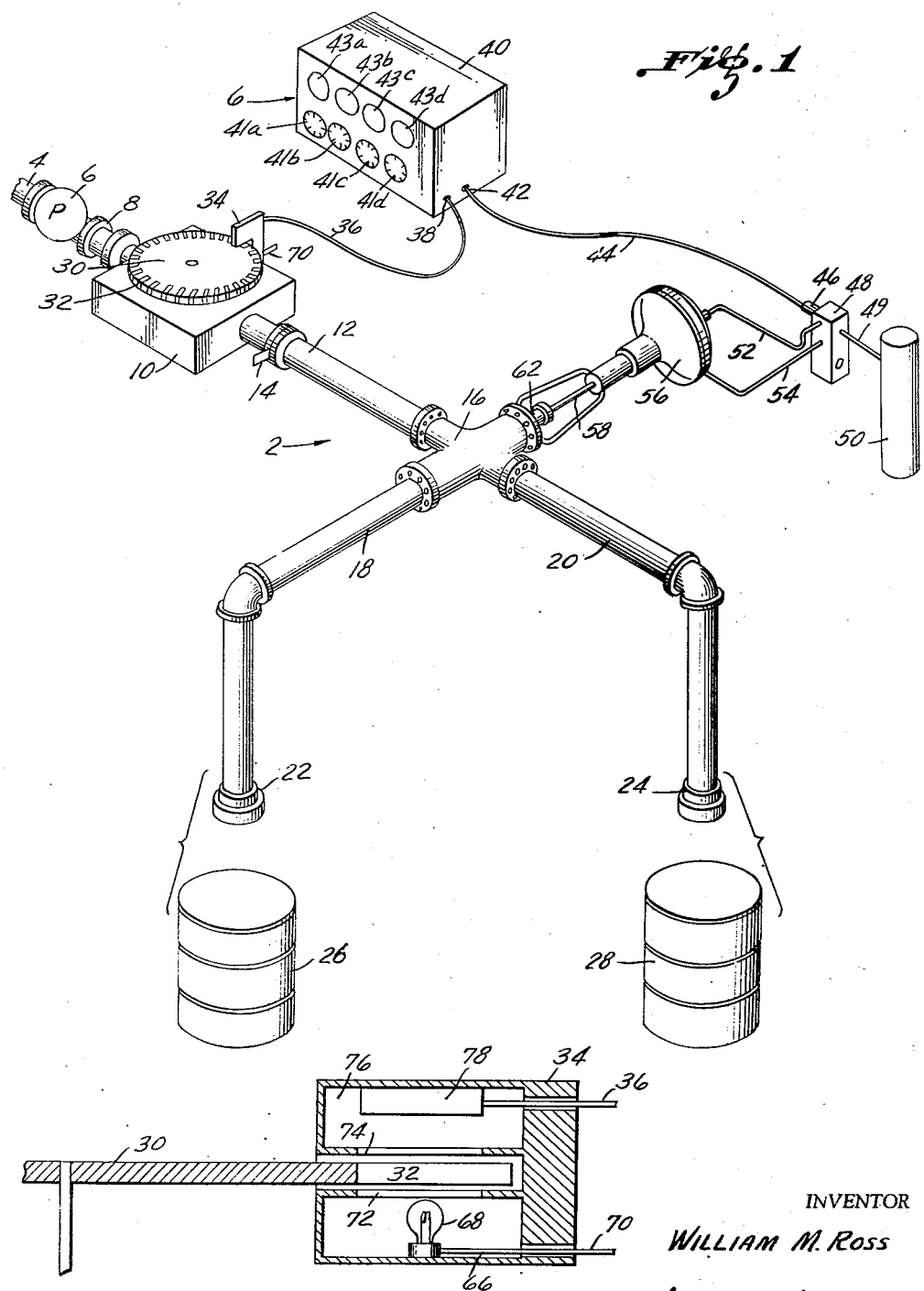
INVENTOR
WILLIAM M. ROSS
BY James H. Littlepage
ATTORNEY

United States Patent Office 2,759,633
Patented Aug. 21, 1956

2,759,633

PREDETERMINED COUNTER CONTROL FOR CONTAINER FILLING SYSTEM

William M. Ross, Memphis, Tenn.

Application September 23, 1955, Serial No. 536,213

4 Claims. (Cl. 222—32)

This invention relates to a control for a container filling system and, more particularly, a control utilizing a meter and predetermined counter for operating a diverting valve in a liquid dispenser.

The primary object of the invention is to provide a metering and control system for a dispenser, by means of which extreme accuracy in the amounts of dispensed liquids or semi-liquids is obtainable, the invention being particularly useful for handling very thick or viscous liquids and semi-liquids. As contrasted with prior art metering and control systems from which no better than 2% accuracy could be expected, when dispensing very thick liquids, the present invention dispenses bulk quantities with an accuracy on the order of $\frac{1}{100}$ of 1%.

Some of the problems besetting prior art meter controlled dispenser, including those utilizing an nutating disc type of positive displacement such as used in this invention, were, first, that they could not be set to trip the control switches with the same accuracy for various quantities. Second, they depended on the absolute accurarcy of the meter. Third, varying sizes and numbers of air bubbles in the thick liquid passing through the meters resulted in varying and unpredictable errors in the metering. According to this invention, it is intended now to provide a meter having a photo-electric pickup for producing signal impulses in response to very small increments of liquid passing through the meter, while imposing no load on the meter, and an automatic reset predetermined counter for feeding an actuating impulse to an electrically controlled diverting valve in response to a predetermined number of signal impulses produced by the pick-up. By this arrangement, only the repetitive accuracy of the meter is important, since any recurring inaccuracy in the meter can be compensated for by changing the pre-setting of the counter. In addition, it is further intended to provide a restricted orifice in the liquid line of the outlet side of the meter, and a pump for maintaining sufficient pressure on the thick liquid passing through the meter so that air bubbles in the liquid are compressed to such negligibly small size that they create no significant error in the repetitive accuracy of the meter, regardless of whether the bubbles were orginally small or large, or bunched in large or small groups.

These and other objects will be apparent from the following specification and drawing, in which:

Fig. 1 is a diagram of the dispensing system, and,

Fig. 2 is a diagram of the photo-electric pick-up.

Referring now to the illustrative diagrams, in which like reference numerals denote similar elements, the dispensing system 2 is fed from a liquid supply line 4. For purposes of specific illustration, it will be assumed the supplied liquid is heavy, thick, and viscous and because of its inherent characteristics and previous handling, has in it colonies of air bubbles of various size and number. From supply line 4, the liquid is forced by a pump 6 via meter input conduit 8 through a nutating disc positive displacement flow meter 10 and out through an output conduit 12 having therein an orifice plate 14. The restriction of the orifice in plate 14 and the force of pump 6 are sufficient to maintain pressure on the fluid passing through meter 10 from 300 to 400 pounds per square inch. The specific details of flow meter 10 form no part of the invention, and various other types may be used so long as they will operate with the metered liquid under back pressure sufficient to compress the entrained air bubbles to negligible size.

After flow through orifice plate 14, the liquid flows to a diverting valve 16 which shifts from one state to another so as to switch the metered liquid to one or the other of branch conduits 18 or 20. The liquid is thus alternately dispensed, first, from nozzle 22 until a container 26 is filled, then from nozzle 24 until a container 28 is filled, et cetera continuously.

In a typical installation, containers are successively filled each with 50 lbs. of thick bulky liquid every seven seconds, with accuracy to the last ounce.

In the illustrated embodiment, the positive displacement flow meter 10 drives a rotating disc 30 with slots 32 regularly spaced so as to pass a given point with each desired increment of liquid flowing through the meter. The weight of the liquid being known, slots 32 are, for example, spaced so that one passes sensing device 34 for each ounce increment of liquid through the meter, thereby resulting in a signal impulse in the output 36 for each increment.

The signal impulses from sensing device 34 are fed to the input 38 of a predetermined electronic counter 40 having automatic reset. The details of such counters, which are standard items of commerce, are well known in the art, the characteristic features for present purposes being that dials 41a—41d may be set so that an actuating impulse is produced in output 42 of each desired number of signals appearing at input 38, and indicators 43a—43d denote the accumulated impulses between each reset. When, for example, 50 lb. containers are to be filled, dials 41a—41d would be set to produce, in output 42, one actuating impulse for each 800 signals (representing ounces of liquid passed through meter 10) appearing at input 38, subject to correction to compensate for repetitive error in the flow meter.

Output 42 of predetermined counter 40 is connected by a lead 44 to a solenoid 46 which actuates a switch valve 48 to connect an air supply 49 leading from a source of compressed air 50 to one or the other of air input lines 52, 54 of a pneumatic motor 56, thereby correspondingly shifting the motor drive rod 58 and valve stem 62 in one direction or the other so that valve 16 connects the meter output conduit 12 with one of branch conduits 18 or 20 while shutting off the other branch conduit.

While various types of sensing devices 34 may be utilized to provide an output impulse for each increment of liquid metered, one form is diagrammed in Fig. 2, wherein are illustrated a lamp box 66 disposed beneath meter disc 30 and enclosing a lamp 68 energized by lead 70 from a suitable osurce of electricity. The rays from lamp 68 shine through slot 72 in the lamp box, through a slot 32 in meter disc 30, and then through a slot 74 in the enclosure 76 of a photoelectric cell 78 so that a signal impulse appears in output lead 36 each time disc 30 rotates to present a new slot 32 between slots 72 and 74.

In the operation of the dispensing system and control, the repetitive error of flow meter 10 is first determined by filling containers 26 and 28 each with a predetermined number of increments of liquid. After accurately weighing the contents of the containers, dials 41a—41d are set to compensate for repetitive error, this being the primary operating characteristic necessary to be determined for the flow meter. The repetitive error of flow meter 10 remains virtually constant, and is unaffected by air bubbles in the liquid because of back-pressure on the fluid in the meter provided by orifice plate 14 and pump 6, and momentary variations of pressure in the meter output conduit resulting from the shifts of distributing valve 16 do not effect the repetitive accuracy of the meter.

The system described above lends itself readily to control of automatic conveyors for transporting containers to and from the filling stations beneath nozzles 22 and 24, since the output impulses from counter 40 may also be used for controlling the conveyor motors which automatically move full containers from under the nozzles and bring along empty containers to be filled.

I claim:

1. In a liquid dispensing system, a liquid supply conduit, a plurality of branch conduits, a diverting valve shiftable between separate states for selectively providing a flow path from said supply conduit to said branch conduits, a liquid flow meter in said supply conduit, a sensing device associated with said flow meter and producing a signal impulse in output means thereof for each increment of liquid flowing through said meter, a predetermined electronic counter of the automatic reset type having input means connected to the output means of said sensing device, said counter producing in output means thereof an actuating impulse for each predetermined number of signal impulses from said sensing device, and means connected to the output means of the counter and responsive to the actuating impulses for shifting said diverting valve from one state to another, whereby to divert the metered fluid from one branch conduit to the other.

2. In a dispensing system for heavy liquids and semi-liquids normally having air bubbles irregularly entrained therein, a supply conduit for said liquid, a plurality of branch conduits, a diverting valve shiftable between separate states for selectively providing a flow path from said supply conduit to said branch conduits, a liquid flow meter in said supply conduit, means for compressing the air bubbles in the liquid passing therethrough whereby to reduce them to negligible size, a sensing device associated with said flow meter and producing a signal impulse in output means thereof for each increment of liquid flowing through said meter, a predetermined electronic counter of the automatic reset type having input means connected to the output of said sensing device, said counter producing in output means thereof an actuating impulse for each predetermined number of signal impulses from said sensing device, and means connected to the output means of the counter and responsive to the actuating impulses for shifting said diverting valve from one state to another, whereby to divert the metered fluid from one branch conduit to the other.

3. The combination claimed in claim 2, the means for compressing the air bubbles in the liquid passing through the flow meter comprising a liquid pump in said supply conduit on the input side of said meter and restricted orifice means in said supply line on the output side of said meter.

4. The combination claimed in claim 3, said flow meter being of the positive displacement type with a disc nutating in accordance with predetermined increments of liquid flowing through the meter.

No references cited.